(12) United States Patent
Misso et al.

(10) Patent No.: US 6,535,357 B1
(45) Date of Patent: Mar. 18, 2003

(54) LATCH FOR DISC DRIVES

(75) Inventors: Nigel F. Misso, Bethany, OK (US); Steve S. Eckerd, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/259,062

(22) Filed: Feb. 26, 1999

Related U.S. Application Data (60) Provisional application No. 60/088,061, filed on Jun. 5, 1998.

(51) Int. Cl.$^7$ .............................. G11B 21/22; G11B 5/54
(52) U.S. Cl. ................................................... 360/256.2
(58) Field of Search ............................ 360/256, 256.2, 360/256.6

(56) References Cited

U.S. PATENT DOCUMENTS

| | | | |
|---|---|---|---|
| 4,594,627 A | 6/1986 | Viskochil et al. ......... | 360/256.2 |
| 4,647,997 A | 3/1987 | Westwood ................ | 360/256.1 |
| 4,881,139 A | 11/1989 | Hazebrouck ............. | 360/256.3 |
| 5,034,837 A | 7/1991 | Schmitz .................... | 360/256.2 |
| 5,043,834 A | 8/1991 | Kubo et al. ............... | 360/256.1 |
| 5,187,627 A | 2/1993 | Hickox et al. ........... | 360/256.2 |
| 5,224,000 A | 6/1993 | Casey et al. .............. | 360/256.1 |
| 5,231,556 A | 7/1993 | Blanks ...................... | 360/256.2 |
| 5,262,912 A | 11/1993 | Hudson et al. ........... | 360/256.2 |
| 5,341,259 A * | 8/1994 | Amirkiai et al. ......... | 360/256.2 |
| 5,363,261 A * | 11/1994 | Eckberg et al. .......... | 360/256.2 |
| 5,581,424 A | 12/1996 | Dunfield et al. ......... | 360/256.2 |
| 5,583,724 A | 12/1996 | Kim et al. ................ | 360/256.2 |
| 5,608,592 A * | 3/1997 | Mizoshita et al. ....... | 360/256.2 |
| 5,612,842 A | 3/1997 | Hickox et al. ........... | 360/256.4 |
| 5,621,591 A * | 4/1997 | Rahimi et al. ............ | 360/265 |
| 5,636,090 A | 6/1997 | Boigenzahn et al. .... | 360/256.4 |
| 5,671,104 A | 9/1997 | Takahashi et al. ....... | 360/256.3 |
| 5,694,271 A | 12/1997 | Stefansky ................. | 360/256.3 |
| 5,717,548 A | 2/1998 | Koester et al. .......... | 360/256.2 |
| 5,734,527 A * | 3/1998 | Reinhart ................... | 360/256.2 |
| 5,764,441 A * | 6/1998 | Aruga et al. ............. | 360/265 |
| 5,768,057 A | 6/1998 | Fernandes et al. ....... | 360/256.1 |
| 5,793,572 A * | 8/1998 | Lalouette et al. ........ | 360/256.1 |
| 5,801,904 A * | 9/1998 | Kinoshita et al. ........ | 360/256.2 |

* cited by examiner

*Primary Examiner*—Brian E. Miller
*Assistant Examiner*—Julie Anne Watko
(74) *Attorney, Agent, or Firm*—Fellers, Snider, et al.

(57) ABSTRACT

A latch for a disc drive, the disc drive having an actuator pivotally supported for moving an array of read/write heads radially across a data storage disc between a parking zone and a data storage zone, the parking zone providing a parking surface for the read/write heads when the disc drive is non-operational, the latch preventing the actuator from pivoting so that the read/write heads remain in the parking zone while the disc drive is non-operational. The disc drive has a voice coil motor for moving the actuator, the voice coil motor including a magnet assembly having a pair of opposed magnet members supported by opposing poles. The latch is interposed between the poles, having a supporting member that supports a latch pawl pivotally between a latched position and an unlatched position. A first latch pole is disposed in a magnetic flux field of the magnet assembly to retain the latch pawl in the latched position when the disc drive is non-operational; a second latch pole is disposed in the magnetic flux field to retain the latch pawl in the unlatched position when the disc drive is operational. In the latched position a slot in the latch pawl receivingly engages a pin supported by the actuator to prevent pivoting of the actuator. In the unlatched position the latch pawl is pivoted by the actuator to disengage the pin from the slot. The latch has an inner stop and an outer stop that limit movement of the read/write heads outwardly beyond an outermost data track and inwardly beyond the parking zone.

21 Claims, 5 Drawing Sheets

LATCH FOR DISC DRIVES

RELATED APPLICATIONS

This application claims the benefit of U.S. Provisional Application No. 60/088,061 entitled LATCH AND STOPS ASSEMBLY FOR DISC DRIVES, filed Jun. 5, 1998.

FIELD OF THE INVENTION

The present invention relates generally to the field of disc drive data storage devices, and more particularly but not by way of limitation, to a latch for an actuator of a disc drive to retain the read/write heads in a parked location when the disc drive is non-operational.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is non-operational, each read/write head is brought to rest upon the adjacent disc in a parking zone where data is not stored. Typically, each read/write head is positioned adjacent the parking zone before the rotational velocity of the spinning discs decreases below a threshold velocity. Below this threshold velocity the spinning discs fail to sustain an air bearing in support of the read/write heads.

Once the heads are positioned in the parking zone, it is necessary to secure the actuator assembly by a latching arrangement to prevent the read/write heads from subsequently moving out onto the data storage zone of the discs while the disc drive is non-operational. Latching arrangements are generally practiced in the art and have included various configurations of springs, solenoids and magnets to secure and release the actuator. For example, see U.S. Pat. No. 5,187,627 entitled MAGNETIC LATCH AND CRASH STOP, issued Feb. 16, 1993, to Hickox and Stram; U.S. Pat. No. 5,224,000 entitled CRASH STOP AND MAGNETIC LATCH FOR A VOICE COIL ACTUATOR, issued Jun. 29, 1993, to Casey and West; and U.S. Pat. No. 5,231,556 entitled SELF-HOLDING LATCH ASSEMBLY, issued Jul. 27, 1993, to Blanks. All of these references are assigned to the assignee of the present invention.

Associated problems with such devices have limited the application in which they can be used. For example, a continuing trend in the industry is the reduction in size of modern disc drives. As a result, the discs of modern disc drives increasingly have smaller diameters and tighter disc-to-disc spacings. Although providing increasing amounts of storage capacity, narrow vertical spacing of the discs gives rise to a problem of increased sensitivity to external mechanical shock. Additionally, as disc drives continue to decrease in size, smaller heads, thinner substrates, longer and thinner actuator arms and thinner gimbal assemblies continue to be incorporated into the disc drives. These factors significantly increase the need to protect the disc drives from incidental contact between the actuator arm/gimbal assemblies and the disc surfaces. Furthermore, market requirements demand ever increasing non-operating shock performance.

Consequently, there has not been available a latching device which will universally meet the ever increasing demands of disc latching in protecting the discs from the deleterious effects of non-operational shock, such as can occur during shipping and handling. Protection from these and other mechanical shocks continue to be a major problem to the industry.

Accordingly, there is a need for an improved latch apparatus for a disc drive to reduce the susceptibility of damage to the disc drive.

SUMMARY OF THE INVENTION

The present invention provides a latch for a disc drive assembly, wherein the disc drive assembly has a disc pack with a data storage disc having a parking zone and a data storage zone. The disc pack includes a spindle motor for rotating the disc. An actuator of the disc drive assembly is pivotally supported for pivoting in a plane parallel to that of the disc, the actuator supporting an array of read/write heads in radial movement across the disc in data reading and writing relationship therewith.

The disc drive has a voice coil motor that interacts with the actuator to move the read/write heads to selected positions in the data storage zone and to the parking zone. The parking zone provides a landing surface for the read/write heads when the disc drive is non-operational, thus preventing damage to stored data on the disc. The voice coil motor includes a magnet assembly having a pair of opposing magnet members supported by a pair of opposing poles. The latch of the present invention is generally interposed between the poles.

A latch pawl is pivotally supported by a supporting member in movement between a latched position and an unlatched position. In a preferred embodiment the latch pawl pivots about an axis that is parallel to an axis of rotation of the actuator. The latch pawl supports a first latch arm having a magnetically permeable member that interacts with a magnetic flux of the magnet assembly to retain the latch pawl in the latched position. The latch pawl furthermore supports an opposing second latch arm that retains the latch pawl in the unlatched position in a similar manner.

The latch pawl has a slot that receivingly engages a portion of the actuator to provide a coupling engagement therebetween. So coupled, pivotal movement of the actuator moves the latch pawl to the latched position when the disc drive is non-operational, and to the unlatched position when the disc drive is operational.

In the non-operational mode of the disc drive, the first latch arm retains the latch pawl position and the coupling engagement prevents movement of the actuator so that the read/write heads remain in the parking zone. On disc drive start-up, the discs are rotated to lift the read-write heads from the disc surface and the actuator pivots, overcoming the retaining force of the first latch arm, to move the latch pawl to the unlatched position. In the operational mode of the disc drive, the second latch arm retains the latch pawl position and the coupling disengagement permits free movement of the actuator as the read/write heads are moved to selected data tracks in the data storage zone.

The latch furthermore has an inner stop and an outer stop to limit the extent of pivotal movement of the actuator.

These and other advantages and features of the present invention will be apparent from the following description when read in conjunction with the drawings and appended claims.

DETAILED DESCRIPTION

Figure 1:
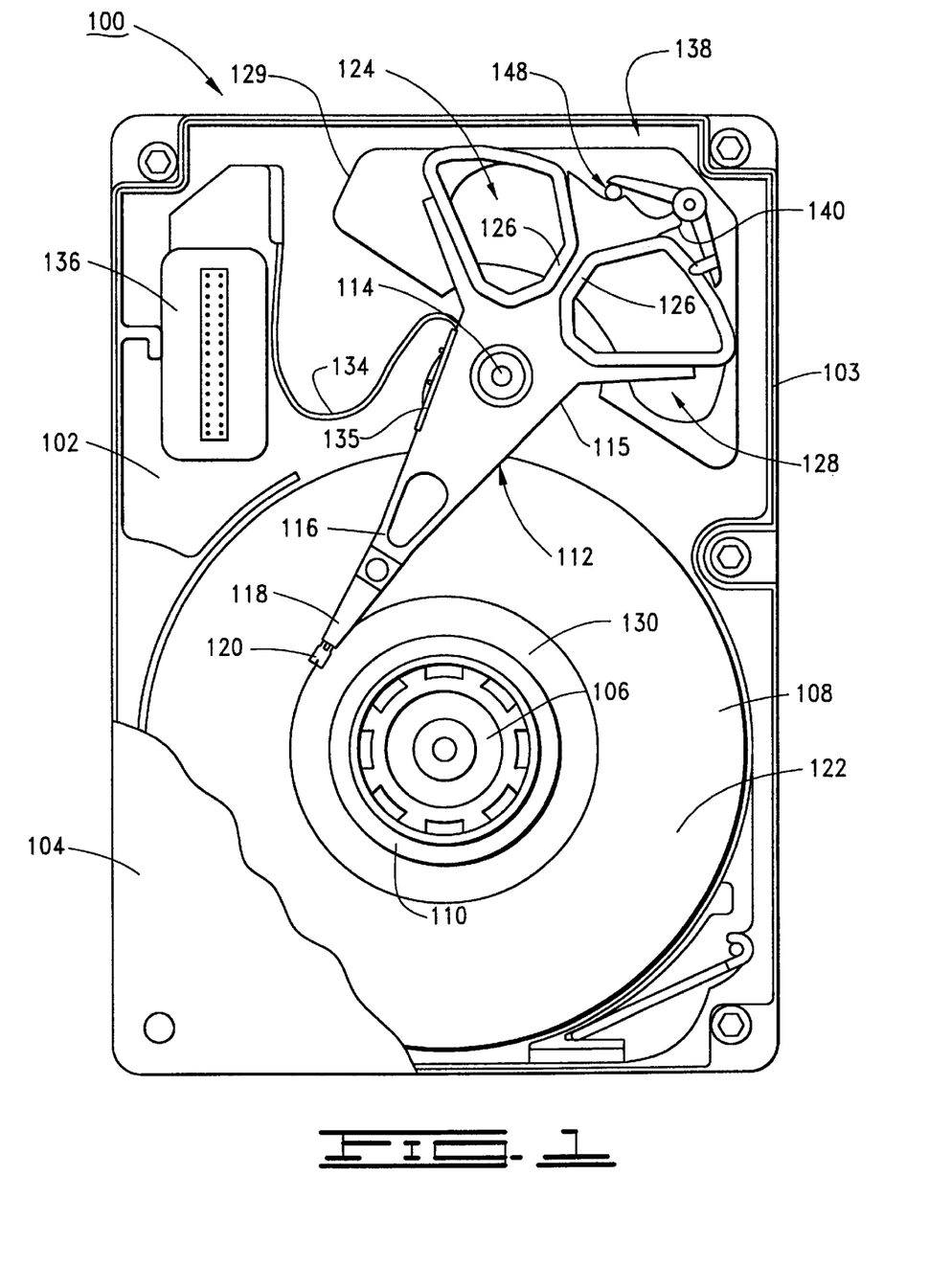
FIG. 1 is a plan view of a disc drive assembly having an actuator latch that is constructed in accordance with the preferred embodiment of the present invention, the actuator latch being positioned in the latched position at a non-operational mode of the disc drive.

Referring to the drawings in general, and more particularly to FIG. 1, shown therein is a top view of a disc drive 100 constructed in accordance with a preferred embodiment of the present invention. The disc drive 100 includes a base deck 102 to which various disc drive components are mounted, and a top cover 104, which together with the base deck 102 and a perimeter gasket 103 provide a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118, in turn, support read/write heads 120, with each of the read/write heads 120 adjacent a surface of one of the discs 108. As mentioned hereinabove, each of the discs 108 has a data storage zone with a data recording surface 122 divided into concentric circular data tracks (not shown), and the read/write heads 120 are positionably located adjacent data tracks to read data from, or write data to, the tracks.

The actuator assembly 112 is controllably positioned by a voice coil motor (VCM) 124, the VCM 124 having an actuator coil 126 supported by the E-block 115 and immersed in the magnetic field generated by a magnet assembly 128. The magnet assembly 128 is provided by a pair of opposing magnetically permeable poles 129 that separatingly support a pair of opposing magnet members 131 (only bottom pole 129 and magnet 131 shown in FIG. 1).

It will be noted that the preferred embodiment as shown in FIG. 1 illustrates the use of a dual-coil actuator. One of skill in the art, however, will recognize that the design choice of a dual coil is related to benefits not directly related to the present invention, and that a single-coil actuator as well as a multiple-coil actuator are contemplated within the scope of the present invention. Accordingly, further discussion or illustration of the size and configuration of the electrical coil of the actuator assembly 112 is not necessary for an understanding of the present invention by one of skill in the art.

A magnetically permeable flux path is provided by the poles 129 and magnets 131 above and below the actuator coil 126. When controlled current is passed through the actuator coil 126, an electromagnetic field is established which interacts with the magnetic circuit of the VCM 124 to cause the actuator coil 126 to move relative to the magnet assembly 128 in accordance with the well-known Lorentz relationship. As the actuator coil 126 moves, the actuator assembly 112 rotates about the pivot bearing assembly 114 causing the actuator arms 116 to move the read/write heads 120 adjacent to, and across, the discs 108. Located near the clamp ring 110 on each of the discs 108 is a parking zone having a landing surface 130, the landing surface 130 comprising a designated area where the read/write heads 120 come to rest when the disc drive 100 is non-operational, thereby preventing the read/write heads 120 from damaging data stored on the disc.

To provide the requisite electrical conduction paths between the read/write heads 120 and disc drive read/write circuitry (not shown), head wires (not separately shown) are routed on the actuator assembly 112 from the read/write heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit 134 is connected to a flex circuit bracket 136 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

During times when the disc drive 100 is non-operational it is desirable to provide a latch assembly 138 to latchingly retain the actuator assembly 112 in the position whereby the read/write heads 120 remain in the landing surface 130. It will be noted that when the disc drive 100 is non-operational the read/write heads 120 directly contact the corresponding discs 108 because no disc rotation results in no air current to sustain the air bearing. If the actuator assembly 112 were to pivot during the non-operational mode of the disc drive 100, then the read/write heads 120 would contact the data recording surface 122. Physical contact with the magnetic surfaces of the data recording surface 122 will corrupt the integrity of the magnetic media, making it unfit for data storage and retrieval.

One common source of forces that tend to pivot the actuator assembly 112 during the non-operational state is external vibrations and shocks associated with the general use and environment in which a personal computer is used. This is especially true with laptop computers which are inherently subjected to handling and use that subject the internal components to shocks and vibrations.

The latch assembly 138 latchingly engages a pin 140 (hereinafter also referred to as a "contact feature") that is supported by the E-block 115 of the actuator assembly 112 when positioned as in FIG. 1 so that the read/write heads 120 are on the landing surface 130. With the latch 138 in a latched mode, as described fully below, the pin 140 is retained by the latch 138 to provide a coupling engagement of the actuator assembly 112 and the latch assembly 138, so as to resist pivotal movement of the actuator assembly 112. With the latch assembly 138 in an unlatched mode, as described fully below, the pin 140 is disengaged from the latch assembly 138 and the actuator assembly 112 can rotate unencumbered.

Figure 2:
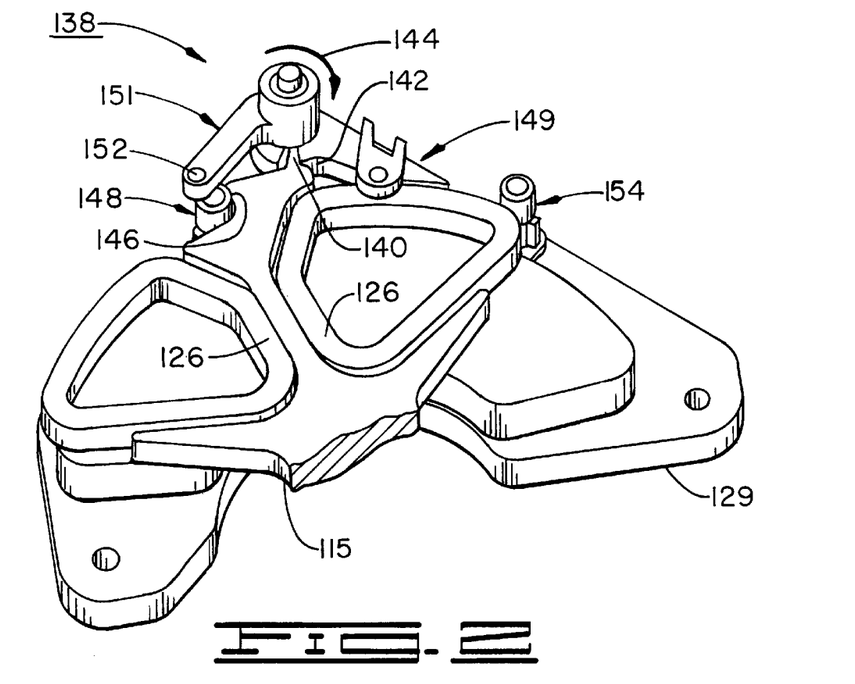
FIG. 2 is an isometric view of a portion of the disc drive assembly showing the actuator latch in greater detail.

FIG. 2 illustrates a portion of the E-block 115 and magnet assembly 128, the top portion of the magnet assembly 128 not shown in order to clearly show the pivotal position of the latch assembly 138 when the disc drive 100 is in the non-operational mode, as is shown in FIG. 1. As the actuator assembly 112 pivots to move the read/write heads to the landing surface 130, the pin 140 is receivingly engaged within a slot 142 provided by the latch assembly 138. This coupling engagement thus pivots the latch assembly 138 in a direction denoted by arrow 144. Pivotal movement of the actuator assembly 112 can be limited by providing a shoulder 146 portion of the E-block 115 that abuttingly engages an inner stop 148.

The latch assembly 138 furthermore supports a first latch arm 149 for retaining the pivotal position of the latch assembly 138 in the latched position. In a preferred embodiment as shown in FIG. 2, a magnetically permeable member, such as a steel ball 150, is moved into the magnetic flux zone provided by the magnet assembly 128 when the latch assembly 138 is in the latched position. The latch assembly 138 is thus retained in the latched position by the magnetic attraction between the ball 150 and the magnet assembly 128. This magnetic retention of the latch assembly 138 in the latched position thus retains the actuator assembly 112 in the parked position so that the read/write heads 120 remain on the landing surface 130 when the disc drive 100 is non-operational.

In starting the disc drive 100 from the non-operational mode, the spindle motor 106 can first be energized to rotate the discs 108 and thereby establish an air bearing to lift the read/write heads 120. The actuator assembly 112 can then be pivoted by providing a controlled current to the actuator coils 126 that is sufficient to overcome the attractive retention force of the ball 150 and magnet assembly 128. As the actuator assembly 112 pivots, the latch 138 is pivoted in a direction opposite to that shown by arrow 144 by the coupling engagement of the pin 140 and slot 142.

Figure 4:
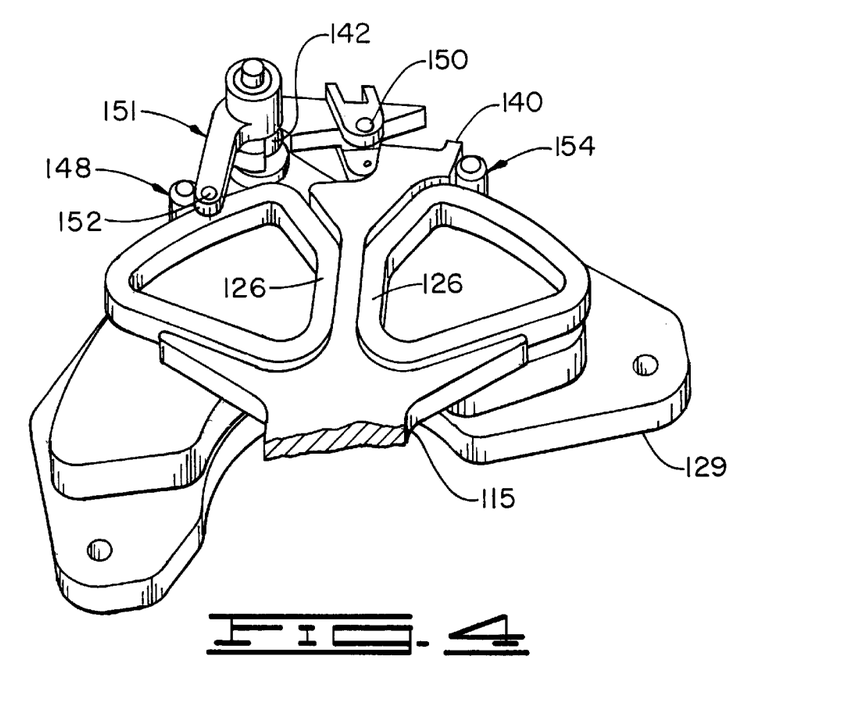
FIG. 4 is an isometric view of a portion of the disc drive assembly showing the actuator latch in greater detail.

Continued pivoting of the actuator assembly 112 eventually pivots the latch assembly 138 to an unlatched position wherein the pin 140 clearingly disengages the slot 142. In the unlatched position the actuator assembly 112 can move freely, unencumbered by the latch assembly 138 so as to position the read/write heads 120 at desired radial positions in the data storage zone of the disc 108. To retain the latch assembly 138 in the unlatched position, it will be noted that the ball 150 is pivoted to a position outside the magnetic flux region provided by the magnet assembly 128. Simultaneously, as shown in FIG. 4, an opposing second latch arm 151 supporting a steel ball 152 is moved into the magnetic flux region and thereby magnetically retains the latch assembly 138 in the unlatched position.

Figure 3:
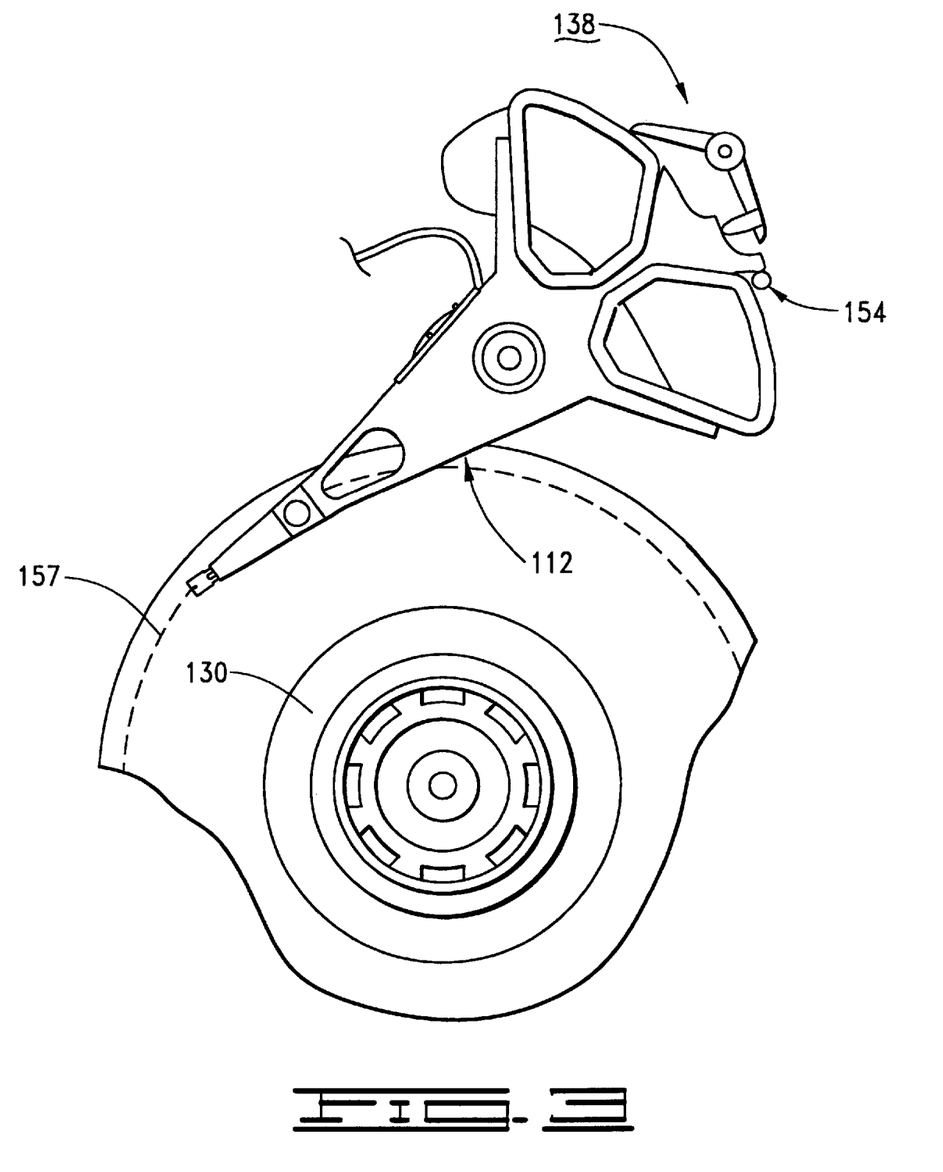
FIG. 3 is a plan view of a portion of the disc drive assembly of FIG. 1 in an operational mode, wherein the actuator assembly moves the read/write head to a data reading and writing relationship with the outermost data track of the data disc.

The latch assembly 138 can provide an outer stop 154 that limits the pivoting motion of the actuator assembly 112 such that the read/write head 120 is not moved radially beyond an outer data track 157 (see FIG. 3).

Figure 5:
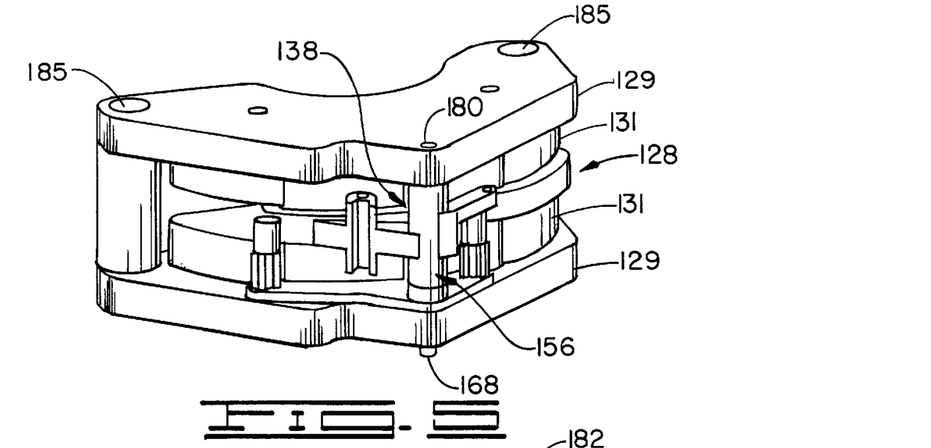
FIG. 5 is an isometric view of the magnet assembly of the disc drive assembly, showing the operative support of the actuator latch between opposing poles of the magnet assembly.

Turning now to FIG. 5, wherein the latch assembly 138 is shown in the manner of support provided by the magnet assembly 128. The latch assembly 138 has a latch pawl 156 that is supported between the poles 129 for pivotal movement about an axis of rotation that is substantially perpendicular to the poles 129, and subtantially parallel to the axis of pivoting of the actuator assembly 112.

Figures 6, 7:
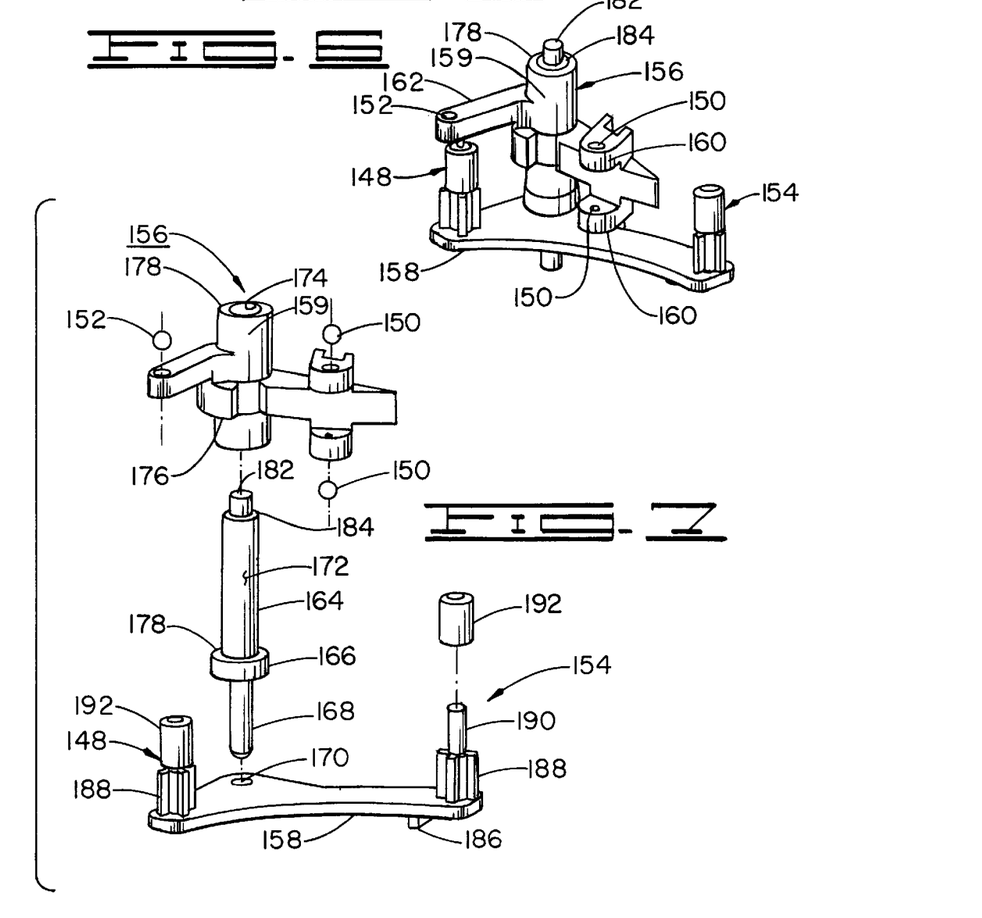
FIG. 6 is an isometric view of the actuator latch of FIG. 1.
FIG. 7 is an exploded isometric view thereof.

FIG. 6 shows an isometric view of the latch assembly 138, which has a base 158 supporting the inner stop 148 and the outer stop 154, as well as the latch pawl 156. It will be noted that in a preferred embodiment the latch pawl 156 has a central body portion 159 from which depends a supporting arm 160, which support the steel ball 150. In the preferred embodiment of FIG. 6, it will be noted the supporting arm supports two balls 150. The pair of balls 150 provides a greater retention force than that which would be provided by a single ball 150. The use of two balls 150 is advantageous in that a greater retaining force can be provided on the actuator assembly 112 in resistance to non-operating shocks that tend to otherwise displace the actuator assembly 112 when the disc drive 100 is non-operational. Note, furthermore, that an opposing extending arm 162 of the second latch arm 151 only has one ball 152. The use of a single ball 152 can be advantageous for at least a couple of reasons. First, the increased magnetic retention is not typically necessary to retain the latch assembly 138 in the unlatched position when the disc drive 100 is operational. Also, the lower retention force requires less torque by the actuator assembly 112 in pivoting the latch assembly 138 from the unlatched to the latched position.

FIG. 7 illustrates an exploded isometric view of the latch assembly 138. The latch pawl 156 is supported about a supporting member 164. The supporting member 164 has a medial base portion 166 with a proximal end 168 extending therefrom, the proximal end 168 passing through an aperture 170 in the base 158 and through an aligned aperture (not shown) in the lower pole 129 to extend below the lower pole 129 (see FIG. 6) so as to matingly engage an aligned aperture (not shown) in the base deck 102 of the disc drive 100. This provides both a secure support of the latch pawl 156 and a positive positioning of the latch assembly 138 and magnet assembly 128 with respect to other base deck 102 mounted components, such as the actuator assembly 112.

The supporting member 164 has a shaft 172 extending upwardly from the base portion 166, the shaft 172 forming a closely-fitting sliding engagement with a bore 174 extending longitudinally through the central body portion 159 of the latch pawl 156. The latch pawl 156 thereby pivots about the shaft 172, being longitudinally supported by the pressing engagement of a lower bearing surface 176 of the latch pawl 156 against an bearing surface 178 of the base portion 166. Note from FIG. 6 that in the assembled condition the latch pawl 156 extends upwardly with a length selected such that a bearing surface 178 at an upper terminal end of the bore 174 is slightly less than the length of the shaft 172 of the supporting member 164. In this manner, the top pole 129 has an aperture 180 (see FIG. 5) that receivingly engages a distally extending locating pin portion 182, the top pole 129 supported by a shoulder surface 184 at the upper extent of the shaft 172. The supporting member 164 thus provides a spacer for supportingly separating of the poles 129 which are drawn together by fasteners 185. In this manner, the supporting member 164 of the latch assembly 138 provides a fixed separation of the poles 129 to permit free movement of the latch 138 relative to the poles 129.

The base 158 furthermore has a locating tab 186 that is receivingly engaged in an aperture (not separately shown) in the lower pole 129 to positively locate the latch assembly 138 relative to the poles 129. Opposite the tab 186, a pair of upwardly extending pin supports 188 are supported by the base 158. In a preferred embodiment each pin support 188 has a distally extending portion 190 that receivingly supports an elastomeric member 192.

The base 158 with extending tab 186 and pin supports 188 are well suited for manufacture as a single-piece molded component part. The distally extending portions 190 are therefore provided as a relatively rigid component, most advantageously formed of a plastic material. The elastomeric member 192, in combination with the supporting extending portion 190, provides a two-stage braking impulse response to the force imparted by the actuator assembly 112 in pressingly engaging the stops 148, 154 at the inner and outer extent of actuator assembly 112 travel. Such a two-stage braking impulse is described in co-pending application Ser. No. 09/183,847 entitled ACTUATOR CRASH STOPS PROVIDING A TWO-STAGE BRAKING IMPULSE and assigned to the assignee of the present application.

The latch assembly 138 is preferably formed as a unitary component by molding methods well known to one skilled in the art. The extending arms 160, 162 can be provided with receiving apertures that are appropriately sized to retain the balls 150, 152 therein by use of a conventional insertion method. In a preferred embodiment the balls 150, 152 are relatively oversized and can be press-fitted into the receiving apertures for retention therein. Other alternative embodiments are contemplated as well, such as overmolding the extending arms 160, 162 to encapsulate a portion of the balls 150, 152; bonding, heat staking, and other well-known methods known to a skilled artisan are contemplated as well.

Figure 8:
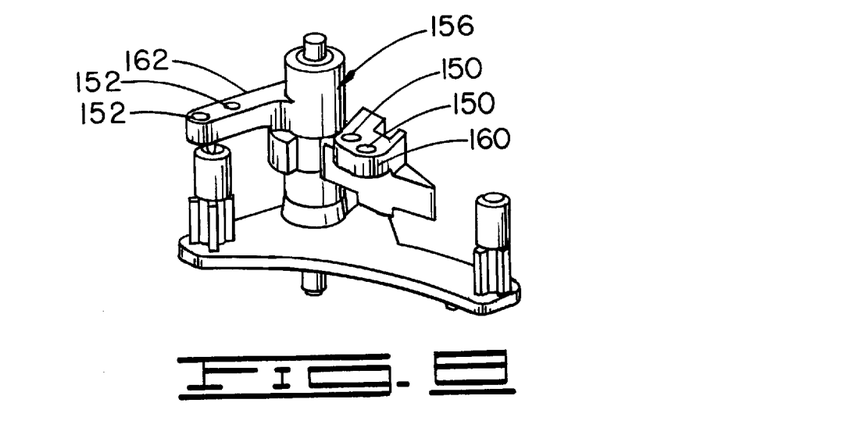
FIG. 8 is an alternative embodiment of the actuator latch of FIG. 6.

It will be noted that an equivalent alternative embodiment would employ the use of differently sized balls 150, 152 to achieve a desired retention force on the latch pawl 156. The retention force is generally proportional to the volume of the ball 150 (or sum of balls 150), and inversely proportional to the distance from the magnet 131 cubed. A ball 150 of roughly twice the volume, for example, could be used equivalently to that of two balls 150 as described above. FIG. 8 illustrates yet another contemplated embodiment wherein two balls 150 are supported on the upper side of the supporting arm 160, and two balls 152 are supported by the supporting arm 162. Supporting more than one ball along the supporting arm 160 rather than in an opposed arrangement as shown in FIG. 6 provides for a more narrow assembly for use in disc drives with extreme space constraints.

Figure 9:
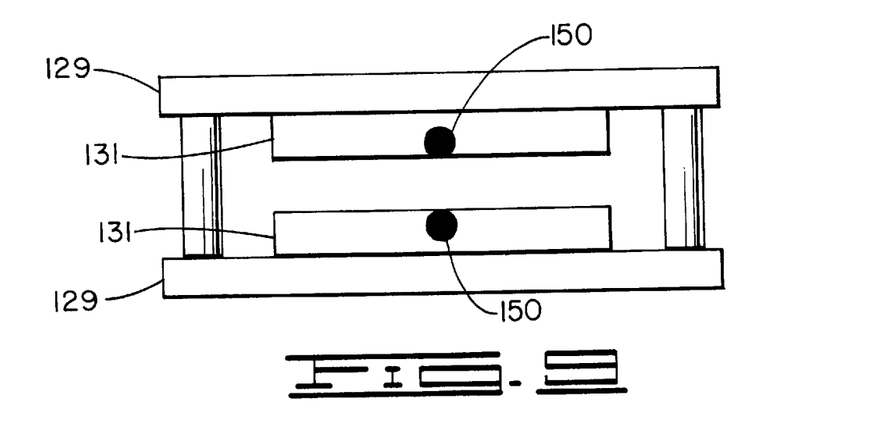
FIG. 9 is a diagrammatical view showing the operable position of the magnetically permeable ball of the actuator latch relative to the magnet member of the magnet assembly.
Figure 10:
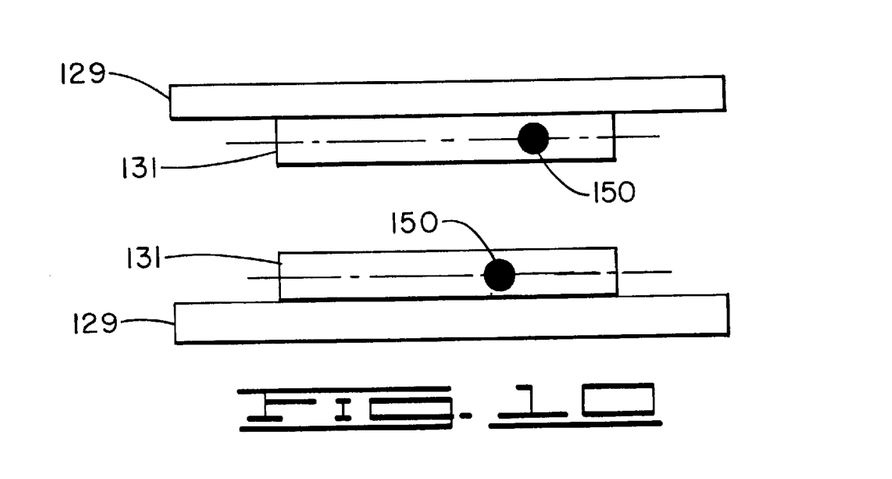
FIG. 10 is a diagrammatical view showing a substantially zero retention force afforded a relatively small magnetically permeable ball of the actuator latch positioned at the neutral axis of the magnet member.

FIG. 9 illustrates the operable position of the balls 150 relative to the magnets 131. In a preferred embodiment the balls 150 are positioned by the supporting arms 160 such that the exposed magnet 131 surface is substantially in a common horizontal plane with the corresponding top or bottom of the adjacent ball 150. That is, the top or bottom of each ball 150 is substantially flush with the magnet 131 surface. This provides the placement of the ball 150 in the strongest portion of the flux field of the magnet assembly 128. Thus, not only the volume but also the vertical positioning of the ball 150 relative to the magnet 131 is a factor to be considered in providing for the desired retention force. For instance, a ball 150 having a diameter less than the thickness of the magnet and vertically positioned at the magnet neutral axis, as shown in FIG. 10, will be subjected to substantially no retention forces. Preferably, it is advantageous to minimize the volume of the ball 150 and position it flush with the magnet surface as discussed and shown in FIG. 9.

Finally, the supporting member 164, being a rigid member in order to maintain the spaced-apart relationship of the poles 129, is well suited for manufacture as a machined or powdered metal component.

The present invention provides a latch assembly (such as 138) for a disc drive (such as 100), wherein the disc drive has a rotating actuator assembly (such as 112) which supports and positions an array of read/write heads (such as 120) in data reading and writing relationship to a number of discs (such as 108). The discs have landing surfaces (such as 130) providing a parking zone wherein the read/write heads land when the disc drive is non-operational.

The actuator is rotated by a voice coil motor (such as 124) that has a magnet assembly (such as 128) that includes a pair of opposing poles (such as 129). The latch has a base (such as 158) that locates the latch relative to the poles, and the latch is interposed between the poles.

A latch pawl (such as 156) is pivotally supported by a supporting member (such as 164) that provides a fixed spacing of the poles of the magnet assembly, the pole having a shaft (such as 172) about which the latch pawl pivots. In a preferred embodiment the latch pawl pivots about an axis that is parallel to an axis of actuator assembly pivoting. A first latch arm (such as 149) has a magnetically permeable ball (such as 150) supported by the latch pawl and magnetically engaging the pole of the magnet assembly to retain the latch in a latched position. An opposing second latch arm (such as 151) has a magnetically permeable ball (such as 152) supported by the latch pawl and magnetically engaging the pole of the magnet assembly to alternatively retain the latch in an unlatched mode.

The actuator assembly has a pin (such as 140) which is receivingly engaged by a slot (such as 142) in the latch pawl to resist rotation of the actuator assembly when the latch is in the latched position. In the unlatched position, the latch pawl is pivoted to receivingly disengage the pin so that the actuator assembly is free to pivot. The latch has an outer stop (such as 154) to limit the pivoting movement of the actuator assembly when the read/write head has moved to an outer extremity of the data storage zone. The latch assembly furthermore has an inner stop (such as 148) to limit the pivoting movement of the actuator assembly when the read/write head has moved to the parking zone.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. A latch for use in a disc drive, the disc drive comprising a data storage disc with a parking zone and a data storage zone, a spindle motor for rotating the data storage disc and an actuator assembly that moves a read/write head to selected positions in the data storage zone and to the parking zone, the latch comprising:

a latch supporting member; and a latch pawl pivotally supported by the latch supporting member in a latched position and in an unlatched position, the latched position providing a coupling engagement between the latch pawl and the actuator assembly, the unlatched position providing an uncoupling engagement between the latch pawl and the actuator assembly, the latch pawl comprising:

a central body portion, rotatable about the latch supporting member, which retains a contact feature of the actuator assembly when the latch pawl is in the latched position, the contact feature moveable along a first plane of travel;

a latch arm which extends from the central body portion;

a support arm which extends from the latch arm in a direction substantially toward the actuator assembly; and a magnetically permeable member supported by the support arm to retain the latch pawl in the latched position, wherein the support arm and the magnetically permeable member extend in a second plane substantially parallel to and displaced from the first plane so that the contact feature passes under the support arm as the latch pawl moves between the respective latched and unlatched positions.

2. The latch of claim 1 wherein the latch pawl further comprises a second latch arm and a second magnetically permeable member supported by the second latch arm to retain the latch pawl in the unlatched position.

3. The latch of claim 1 wherein the disc drive further comprises a magnet assembly that provides a magnetic flux field, wherein the actuator assembly has an actuator coil that when energized with a controlled voltage produces an electromagnetic force that interacts with the magnetic flux field to move the actuator assembly, the actuator assembly moveable to a selected position to bring the contact feature into contact with the latch pawl to move the latch pawl to the latched position.

4. The latch of claim 3 wherein the magnet assembly comprises opposing magnetic poles, each magnetic pole, in turn, supporting a magnet member, the magnet members and magnetic poles providing the magnetic flux field, wherein the first plane passes between the magnet members and the second plane intersects a selected one of the magnet members so that the magnetically permeable member is disposed adjacent the selected one of the magnet members when the latch pawl is in the latched position.

5. The latch of claim 1 wherein the support arm supports two magnetically permeable members.

6. The latch of claim 1 wherein the central body portion of the latch pawl has a slot that receivingly engages the contact feature to retain the latch in the latched position.

7. The latch of claim 1 further comprising:

an outer stop limiting pivotal movement of the actuator assembly so the read/write heads move radially outward substantially no farther than the outermost data storage track; and an inner stop limiting pivotal movement of the actuator assembly so the read/write heads move radially inward substantially no farther than the parking zone.

8. The latch of claim 7 wherein each of the inner and outer stops comprises:

a rigid supporting pin; and an elastomeric bumper member supported by the supporting pin.

9. The latch of claim 1 wherein the actuator assembly comprises two adjacent coils, and wherein at least one of the coils passes under the support arm.

10. The latch of claim 1 wherein the support arm and the magnetically permeable member are respectively characterized as a first support arm and a first magnetically permeable member, and wherein the latch further comprises a second support arm which extends from the latch arm and a second magnetically permeable member supported by the second support arm in a third plane substantially parallel to and displaced from the first plane, wherein the first and second support arm and the latch arm form a substantially U-shaped channel through which the contact feature travels.

11. A disc drive, comprising:

a base deck;

a disc pack supported by the base deck, the disc pack comprising:

a spindle motor supported by the base deck; and a disc supported by the spindle motor for rotation when the disc drive is operational, the disc having a data storage zone and a parking zone;

an actuator assembly pivotally supported by the base deck and moving, in turn, a read/write head to selected positions in the data storage zone and the parking zone; and a latch which retains the read/write head in the parking zone when the disc drive is non-operational, the latch comprising:

a latch supporting member; and a latch pawl pivotally supported by the latch supporting member in a latched position and in an unlatched position, the latched position providing a coupling engagement between the latch pawl and the actuator assembly, the unlatched position providing an uncoupling engagement between the latch pawl and the actuator assembly, the latch pawl comprising:
- a central body portion, rotatable about the latch supporting member, which retains a contact feature of the actuator assembly when the latch pawl is in the latched position, the contact feature moveable along a first plane of travel;
- a latch arm which extends from the central body portion;
- a support arm which extends from the latch arm in a direction substantially toward the actuator assembly; and
- a magnetically permeable member supported by the support arm to retain the latch pawl in the latched position, wherein the support arm and the magnetically permeable member extend in a second plane substantially parallel to and displaced from the first plane so that the contact feature passes under the support arm as the latch pawl moves between the respective latched and unlatched positions.

12. The latch of claim 11, wherein the latch pawl further comprises a second latch arm and a second magnetically permeable member to retain the latch pawl in the unlatched position.

13. The latch of claim 11 wherein the disc drive further comprises a magnet assembly that provides a magnetic flux field, wherein the actuator assembly has an actuator coil that when energized with a controlled voltage produces an electromagnetic force that interacts with the magnetic flux field to move the actuator assembly, the actuator assembly moveable to a selected position to bring the contact feature into contact with the latch pawl to move the latch pawl to the latched position.

14. The latch of claim 13 wherein the magnet assembly comprises opposing magnetic poles, each magnetic pole, in turn, supporting a magnet member, the magnet members and magnetic poles providing the magnetic flux field, wherein the first plane passes between the magnet members and the second plane intersects a selected one of the magnet members so that the magnetically permeable member is disposed adjacent the selected one of the magnet members when the latch pawl is in the latched position.

15. The latch of claim 11 wherein the support arm supports two magnetically permeable members.

16. The latch of claim 11 wherein the central body portion of the latch pawl has a slot that receivingly engages the contact feature to retain the latch in the latched position.

17. The latch of claim 11 further comprising:
- an outer stop limiting pivotal movement of the actuator assembly so the read/write heads move radially outward substantially no farther than the outermost data storage track; and
- an inner stop limiting pivotal movement of the actuator assembly so the read/write heads move radially inward substantially no farther than the parking zone.

18. The latch of claim 17 wherein the stops comprise:
- a rigid supporting pin; and
- an elastomeric bumper member supported by the supporting pin.

19. The latch of claim 11 wherein the actuator assembly comprises two adjacent coils, and wherein at least one of the coils passes under the support arm.

20. The latch of claim 11 wherein the support arm and the magnetically permeable member are respectively characterized as a first support arm and a first magnetically permeable member, and wherein the latch further comprises a second support arm which extends from the latch arm and a second magnetically permeable member supported by the second support arm in a third plane substantially parallel to and displaced from the first plane, wherein the first and second support arm and the latch arm form a substantially U-shaped channel through which a portion of the actuator assembly travels.

21. A disc drive comprising:
- a rotatable actuator assembly; and
- latch means for latching the actuator assembly.

* * * * *